3,185,683
ALKYL AMINOALKYLENEOXY PREGNENES

Edward Warren Cantrall, Pearl River, Seymour Bernstein, New City, and Benjamin Arthur Riccardi, Pearl River, N.Y., assignors to American Cyanamid Company, Stamford, Conn., a corporation of Maine
No Drawing. Filed Mar. 14, 1963, Ser. No. 265,027
12 Claims. (Cl. 260—239.55)

This invention relates to new steroid compounds. More particularly, it relates to 3-substituted ethers of the pregnene series, mineral acid salts thereof and methods of preparing the same.

The novel steroids can be illustrated by the following formula:

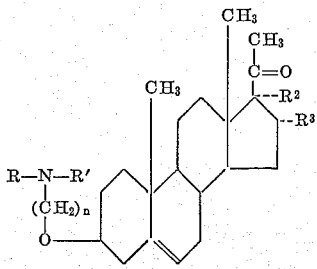

in which R and R' are lower alkyl radicals and $R^2$ and $R^3$ are hydroxyl radicals and when taken together represent a diloweralkylidenedioxy radical, and $n$ represents an integer from 2 to 4 inclusive.

The above compounds are crystalline solids. The free bases are insoluble in water and somewhat soluble in the usual organic solvents such as, for example, chloroform, acetone, petroleum ether, etc., whereas the acid salts are water soluble.

The compounds of the present invention are, in general, prepared by reacting 16-dehydropregnenolone 20-ethylene ketal with potassium tertiary butoxide in a solvent and subsequently with a diloweralkylaminoalkyl halide. The resulting 3-diloweralkylaminoalkoxy-5,16-pregnadien-20-one is then reacted with an oxidizing agent such as, for example, potassium permanganate in the presence of a solvent under acid conditions. The products resulting are 3 - diloweralkylaminoalkoxy - 16α,17α-dihydroxy-5-pregnen-20-ones. The latter, when reacted with a diloweralkyl ketone under acid conditions, produces 3-diloweralkylamino alkoxy-16α,17α-(lower alkylidene)-dioxy-5-pregnen-20-ones.

The steroid compounds of this invention have shown anticholesteremic activity and they are, therefore, useful in the treatment of hypercholesteremia and related vascular disorders. Moreover, the compounds of this invention show adrenal suppression activity.

The steroids described above may be dispensed as the active ingredient in compositions comprising the steroid and an edible carrier. While the amount of steroid to be given daily will depend on many factors such as size, weight, age, etc., of the warm-blooded animal, it has been found that a daily intake of from 50 mg. to 250 mg. will produce good results. The dosage unit may be in a form for a single unit per day, or smaller forms for use as multiple units per day. In the case of tablets, they may be of larger size, scored for use as fractional units one or more times per day.

The compositions can be dispensed in the form of soft or hard shell gelatin capsules. Also present in the capsules may be diluents such as lactose, starch, magnesium oxide, magnesium stearate and the like. The capsules may be large enough to provide the desirable daily dosage or smaller to be used in multiple doses per day.

The present compositions may be dispensed as parenteral solutions or suspensions. If larger doses in small amounts are desirable it may be necessary to use parenteral suspensions because the solubility of the steroids in substantially aqueous solutions is limited.

The compositions of the present invention may be administered in the form of syrups or pediatric drops. Such formulations usually contain one or more of the following, suspending agents, buffer salts, stabilizers, preservatives, etc.

The following examples describe the preparation of representative 3-substituted ethers of the pregnene series and mineral acid salts thereof of the present invention.

EXAMPLE I

*Preparation of 3-dimethylaminoethoxy-5,16-pregnadien-20-one*

To a solution of 13 g. of 16-dehydropregnenolone 20-ethylene ketal in 350 ml. of tetrahydrofuran is added 7 g. of potassium tertiary butoxide in 150 ml. of tetrahydrofuran and the mixture is refluxed with stirring for one hour. Dimethylaminoethyl chloride (23 ml.) is then added dropwise over a 2-hour period and heating is continued for an additional 2 hours. The mixture is cooled, filtered and the filtrate is evaporated to a gummy solid which is dissolved in ether. Hydrogen chloride gas is passed through the ether solution and the solid thus obtained is filtered and washed with ether to give 6.4 g. This material is dissolved in water, washed with ether and the aqueous phase is then made alkaline with sodium hydroxide and extracted with ether. The ether extract is dried and evaporated to give 2.8 g. The analytical sample is obtained after several crystallizations from aqueous acetone; melting point 131–134° C., $[\alpha]_D^{25}$ −22.8° (chloroform).

EXAMPLE II

*Preparation of 3-diethylaminoethoxy-5,16-pregnadien-20-one*

Following the procedure of Example I and using diethylaminoethyl chloride in place of dimethylaminoethyl chloride provides the compound of the example.

EXAMPLE III

*Preparation of 3-dimethylaminopropoxy-5,16-pregnadien-20-one*

Following the procedure of Example I and using dimethylaminopropyl chloride in place of dimethylaminoethyl chloride gives the compound of the example.

EXAMPLE IV

*Preparation of 3-dimethylaminoethoxy-16α,17α-dihydroxy-5-pregnen-20-one*

To a solution of 1.0 g. of 3-dimethylaminoethoxy-5,16-pregnadien-20-one in 35 ml. of acetone, cooled to 0° C. is added a solution of 0.45 g. of potassium permanganate in 26 ml. of 85% aqueous acetone and 0.2 ml. of acetic acid over a 30 minute period. Aqueous sodium bisulfite is then added and the brown precipitate is removed by filtration. The filtrate is concentrated to about one-third of the original volume and water is added. The resulting solid is filtered and washed with water to give 0.55 g. The compound is purified by crystallization from aqueous acetone; melting point 192–195° C., $[\alpha]_D^{25}$ −51.5° (chloroform).

EXAMPLE V

*Preparation of 3-diethylamino ethoxy-16α,17α-dihydroxy-5-pregnen-20-one*

Following the procedure of Example IV, use of 3-diethylaminoethoxy15,16-pregnadien-20-one in place of 3- dimethylaminoethoxy - 5,16 - pregnadien-20-one provides the compound of the example.

EXAMPLE VI

*Preparation of 3-dimethylaminopropoxy-16α,17α-dihydroxy-5-pregnen-20-one*

Following the procedure of Example IV and using 3-dimethylaminopropoxy-5,16-pregnadien-20-one in place of 3-dimethylaminoethoxy-5,16-pregnadien-20-one provides the compound of the example.

EXAMPLE VII

*Preparation of 3-dimethylaminoethoxy-16α,17α-isopropylidenedioxy-5-pregnen-20-one*

A solution of 0.53 g. of 3-dimethylaminoethoxy-16α, 17α-dihydroxy-5-pregnen-20-one in 100 ml. of acetone containing 0.13 ml. of 72% perchloric acid is stirred for 2 hours at room temperature. The solution is then diluted with water, neutralized with sodium bicarbonate and evaporated. The resulting solid is filtered to give 0.49 g. Three crystallizations from aqueous acetone gives 0.26 g.; melting point 130–133° C., $[\alpha]_D^{25}$ —3° (chloroform).

EXAMPLE VIII

*Preparation of 3-dimethylaminoethoxy-16α,17α-isopropylidenedioxy-5-pregnen-20-one*

Following the procedure of Example VII and using 3-diethylaminoethoxy-16α,17α-dihydroxy - 5-pregnen-20-one in place of 3-dimethylaminoethoxy-16α,17α-dihydroxy-5-pregnen-20-one gives the compound of the example.

EXAMPLE IX

*Preparation of 3-dimethylaminopropoxy-16α,17α-isopropylidenedioxy-5-pregnen-20-one*

Following the procedure of Example VII and substituting 3-dimethylaminopropoxy-16α,17α-dihydroxy-5-pregnen-20-one in place of 3-dimethylaminoethoxy-16α,-17α-dihydroxy-5-pregnen-20-one the compound of the example is obtained.

EXAMPLE X

*Preparation of 3-dimethylaminoethoxy-16α,17α-butylidenedioxy-5-pregnen-20-one*

Following the procedure of Example VII and substituting methylethylketone in place of acetone produces the compound of the example.

EXAMPLE XI

*Preparation of 3-dimethylaminoethoxy-16α,17α-dihydroxy-5-pregnen-20-one hydrochloride*

The product of Example IV is dissolved in ether and treated with hydrogen chloride to give the corresponding hydrochloride salt.

EXAMPLE XII

*Preparation of 3-dimethylaminoethoxy-16α,17α-isopropylidenedioxy-5-pregnen-20-one hydrochloride*

The product of Example VII after dissolving in ether is treated with hydrogen chloride to give the corresponding hydrochloride salt.

EXAMPLE XIII

*Preparation of 3-diethylaminoethoxy-16α,17α-isopropylidenedioxy-5-pregnen-20-one sulfate*

The product of Example VIII dissolved in ether is treated with sulfuric acid to give the corresponding sulfate salt.

We claim:
1. A compound of the formula:

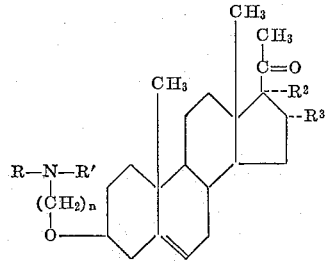

in which R and R' are lower alkyl, $R_2$ and $R_3$ are hydroxyl and when taken together represent a diloweralkylidenedioxy group, and $n$ represents an integer from 2 to 4 inclusive.

2. 3-diloweralkylaminoethoxy-16α,17α - dihydroxy-5-pregnen-20-ones.

3. The compound 3-dimethylaminoethoxy-16α,17α-dihydroxy-5-pregnen-20-one.

4. The compound 3-diethylaminoethoxy - 16α,17α-dihydroxy-5-pregnen-20-one.

5. The compound 3-dimethylaminopropoxy-16α,17α-dihydroxy-5-pregnen-20-one.

6. The compound 3-dimethylaminoethoxy-16α,17α-isopropylidenedioxy-5-pregnen-20-one.

7. The compound 3 - diethylaminoethoxy-16α,17α-isopropylidenedioxy-5-pregnen-20-one.

8. The compound 3 - dimethylaminopropoxy-16α,17α-isopropylidenedioxy-5-pregnen-20-one.

9. The compound 3-dimethylaminoethoxy-16α,17α-butylidenedioxy-5-pregnen-20-one.

10. The compound 3-dimethylaminoethoxy-16α,17α-dihydroxy-5-pregnen-20-one hydrochloride.

11. The compound 3-dimethylaminoethoxy-16α,17α-isopropylidenedioxy-5-pregnen-20-one hydrochloride.

12. The compound 3-diethylaminoethoxy-16α,17α-isopropylidenedioxy-5-pregnen-20-one sulfate.

References Cited in the file of this patent
Bernstein et al.: J.A.C.S. 81, p. 1689–96 (1959).